(12) United States Patent
Nishiyama et al.

(10) Patent No.: US 6,637,528 B2
(45) Date of Patent: Oct. 28, 2003

(54) BIT APPARATUS

(75) Inventors: Akio Nishiyama, Saitama-ken (JP);
Osamu Nakamura, Tokyo (JP);
Kazutaka Kanda, Toyama-ken (JP);
Masahiro Arai, Nagano-ken (JP);
Kunio Komaki, Kanagawa-ken (JP)

(73) Assignee: Japan National Oil Corporation, Tokyo (JP)

( * ) Notice: Subject to any disclaimer, the term of this patent is extended or adjusted under 35 U.S.C. 154(b) by 6 days.

(21) Appl. No.: 09/832,231

(22) Filed: Apr. 11, 2001

(65) Prior Publication Data

US 2001/0042644 A1 Nov. 22, 2001

(30) Foreign Application Priority Data

Apr. 12, 2000 (JP) ........................... 2000-110099

(51) Int. Cl.$^7$ .............................................. E21B 10/22
(52) U.S. Cl. ........................................ 175/371; 384/95
(58) Field of Search ...................... 384/91–96; 175/371, 175/372

(56) References Cited

U.S. PATENT DOCUMENTS

| 2,592,277 A | * | 4/1952 | Hammer ...................... 384/96 |
|---|---|---|---|
| RE28,625 E | * | 11/1975 | Cunningham ................. 384/96 |
| 4,157,122 A | * | 6/1979 | Morris ........................ 175/369 |
| 4,260,203 A | * | 4/1981 | Garner ......................... 384/96 |
| 4,445,791 A | | 5/1984 | Klima |
| 4,729,440 A | * | 3/1988 | Hall ............................ 175/107 |
| 4,756,631 A | * | 7/1988 | Jones .......................... 175/359 |

FOREIGN PATENT DOCUMENTS

| GB | 2030319 A | 4/1980 |
|---|---|---|
| GB | 2117430 A | 12/1983 |

* cited by examiner

Primary Examiner—Thomas B. Will
Assistant Examiner—Meredith C. Petravick
(74) Attorney, Agent, or Firm—Pillsbury Winthrop LLP

(57) ABSTRACT

A bit apparatus in which a cutter member having cutting teeth is axially supported on a shaft for rotation about the shaft, and a bearing mechanism is interposed between the cutter member and the shaft. The bearing mechanism includes at least a radial bearing for bearing a radially directed load and a thrust bearing for bearing an axially directed load. The radial bearing has a shaft-side split bearing member and a cutter-side split bearing member that are opposed to or in sliding contact with each other and capable of rotating relative to each other.

14 Claims, 14 Drawing Sheets

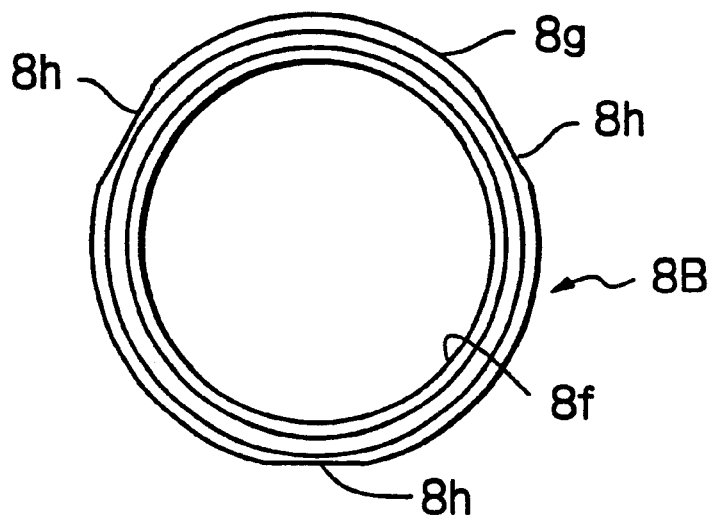
Fig. 7A
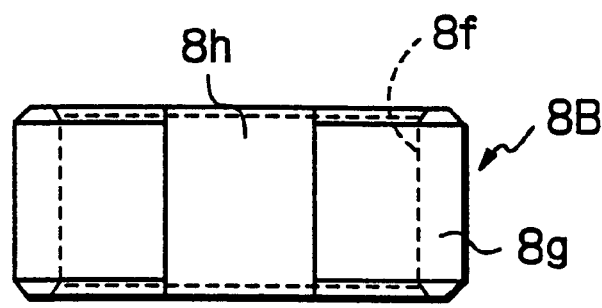
Fig. 7B
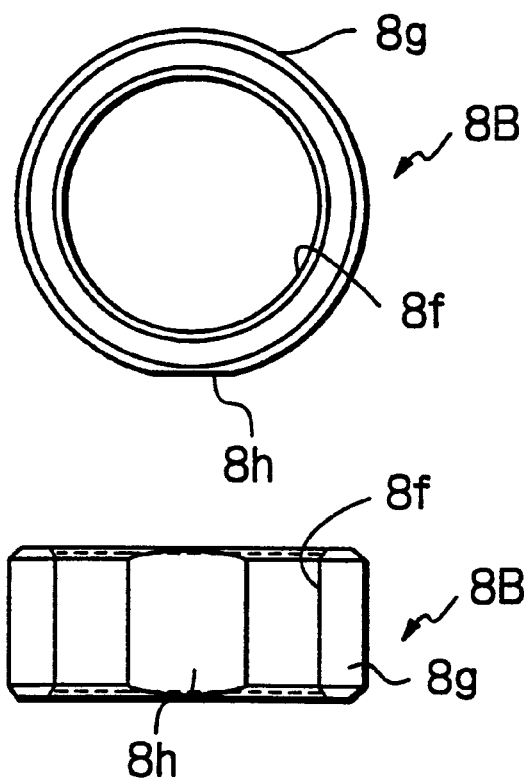
Fig. 7C
Fig. 7D

BIT APPARATUS

BACKGROUND OF THE INVENTION

This invention relates to improvements in a bit apparatus in which a cutter member having cutting teeth is axially supported on a shaft for rotation about the shaft, and which includes a bearing mechanism interposed between the cutter member and the shaft.

A known bit apparatus, such as a tri-con bit apparatus, includes a cutter member, which has cutting teeth, axially supported on a shaft so as to be rotatable about the shaft, and a bearing mechanism interposed between the cutter member and the shaft.

The bearing mechanism basically comprises at least a radial bearing for receiving load in the radial direction and a thrust bearing for receiving load in the axial direction. Beryllium-copper alloy and a hard-metal alloy, which exhibit durability to drilling impact when the bit apparatus is used, are the materials used to manufacture the radial and thrust bearings.

There are instances where the oil seal in a tri-con bit apparatus is destroyed during drilling, allowing muddy water to penetrate the interior of the bearing mechanism. Hard particles contained in the muddy water find their way into the bearing mechanism, causing the beryllium-copper alloy and hard-metal alloy to sustain wear. The problem with the conventional tri-con bit apparatus is a short overall service life caused by such wear in the bearing mechanism.

SUMMARY OF THE INVENTION

Accordingly, an object of the present invention is to provide a bit apparatus in which bearing-mechanism wear can be minimized to prolong service life.

According to the present invention, the foregoing object is attained by providing a bit apparatus in which a cutter member having cutting teeth is axially supported on a shaft for rotation about the shaft, and a bearing mechanism is interposed between the cutter member and the shaft, wherein the bearing mechanism comprises: at least a radial bearing for bearing a radially directed load and a thrust bearing for bearing an axially directed load; the radial bearing including a shaft-side split bearing member and a cutter-side split bearing member, the shaft- and cutter-side split bearing members being rotatable relative to each other.

In a preferred embodiment, the shaft-side split bearing member is formed to have an engaged portion for engaging with an engaging portion, which has been formed on the shaft, in such a manner that the shaft-side split bearing member will co-rotate with the shaft.

In a preferred embodiment, the cutter-side split bearing member is formed to have an engaged portion for engaging with an engaging portion, which has been formed on the cutter member, in such a manner that the cutter-side split bearing member will co-rotate with the cutter member.

In a preferred embodiment, a clearance on the order of 30 to 300 $\mu$m is provided between the shaft-side split bearing member and the cutter-side split bearing member.

In a preferred embodiment, the radial bearing is a hard alloy in which a main ingredient is a tungsten carbide substance containing a cobalt substance of 5 to 20 mass percent.

In a preferred embodiment, wherein a diamond film is formed on at least one of the shaft- and cutter-side split bearing members and on mutually opposing surfaces of both of the members.

According to another aspect of the present invention, the foregoing object is attained by providing a bit apparatus in which a cutter member having cutting teeth is axially supported on a shaft for rotation about the shaft, and a bearing mechanism is interposed between the cutter member and the shaft, wherein the bearing mechanism comprises: at least a radial bearing for bearing a radially directed load and a thrust bearing for bearing an axiall directed load; the thrust bearing including a shaft-side split bearing member and a cutter-side split bearing member, the shaft- and cutter-side split bearing members being rotatable relative to and in sliding contact with each other.

In a preferred embodiment, the shaft-side split bearing member is formed to have an engaged portion for engaging with an engaging portion, which has been formed on the shaft, in such a manner that the shaft-side split bearing member will co-rotate with the shaft.

In a preferred embodiment, the cutter-side split bearing member is formed to have an engaged portion for engaging with an engaging portion, which has been formed on the cutter member, in such a manner that the cutter-side split bearing member will co-rotate with the cutter member.

In a preferred embodiment, a sliding-contact clearance on the order of 30 to 300 $\mu$m is provided between the shaft-side split bearing member and the cutter-side split bearing member.

In a preferred embodiment, the thrust bearing is a hard alloy in which a main ingredient is a tungsten carbide substance containing a cobalt substance of 5 to 20 mass percent.

In a preferred embodiment, a diamond film is formed on at least one of the shaft- and cutter-side split bearing members and on sliding-contact surfaces thereof.

In a preferred embodiment, the engaged portion is a groove or notch.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A to 2D are diagrams useful in describing a radial bearing (radial bushing) shown in FIG. 1, in which FIG. 2A is a plan view illustrating a shaft-side split bearing member of the radial bearing, FIG. 2B a side view showing the shaft-side split bearing member illustrated in FIG. 2A, FIG. 2C a plan view showing a cutter-side split bearing member of the radial bearing, and FIG. 2D a side view of a cutter-side split bearing member illustrated in FIG. 2C;

FIGS. 3A to 3D are diagrams useful in describing a radial bearing (nose pin bushing) shown in FIG. 1, in which FIG. 3A is a plan view illustrating a shaft-side split bearing member of the radial bearing, FIG. 3B a side view showing the shaft-side split bearing member illustrated in FIG. 3A, FIG. 3C a plan view showing a cutter-side split bearing member of the radial bearing, and FIG. 3D a side view of a cutter-side split bearing member illustrated in FIG. 3C;

FIGS. 4A to 4D are diagrams useful in describing a modification of the radial bearing (radial bushing) shown in FIG. 2, in which FIG. 4A is a plan view illustrating the shaft-side split bearing member of the radial bearing, FIG.

Figure 1:
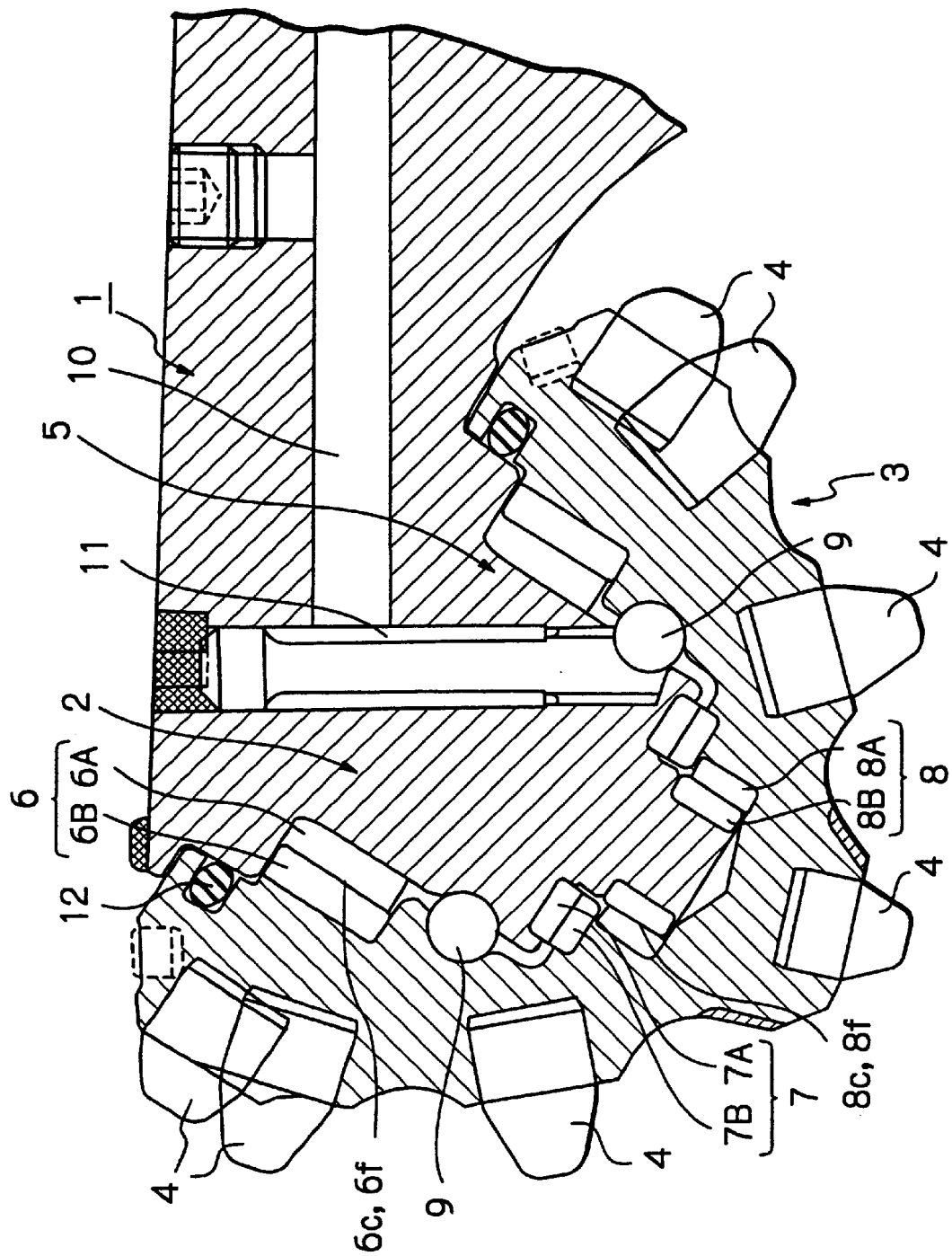
FIG. 1 is an enlarged view illustrating the principal components of a bearing mechanism in a bit apparatus according to the present invention.
Figure 4A:
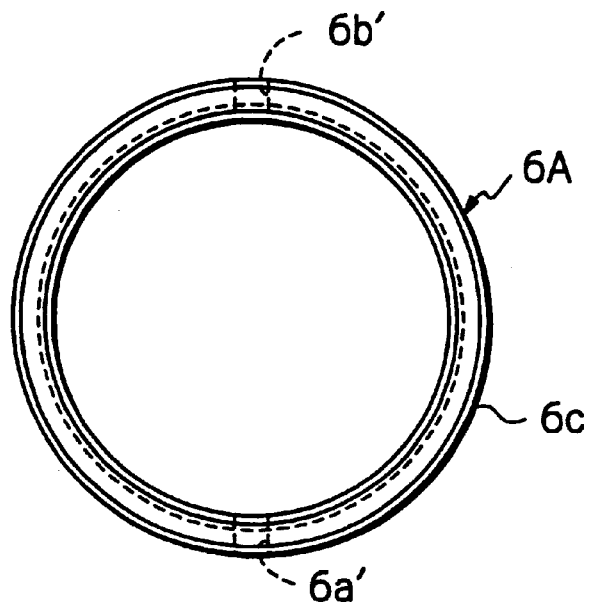
Figure 4B:
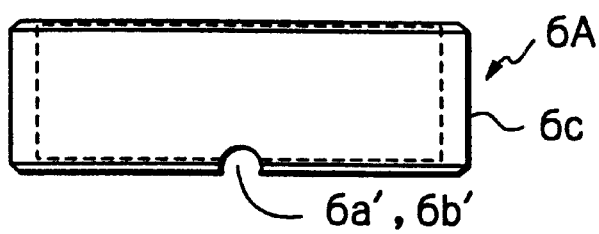
Figure 4C:
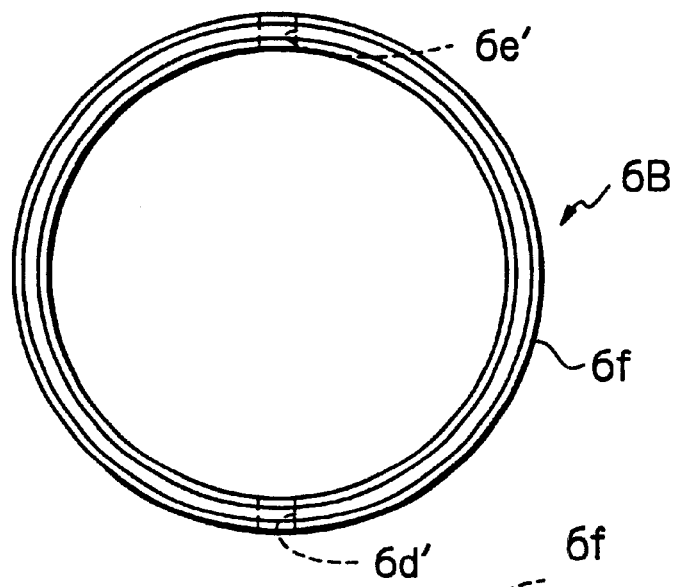
Figure 4D:
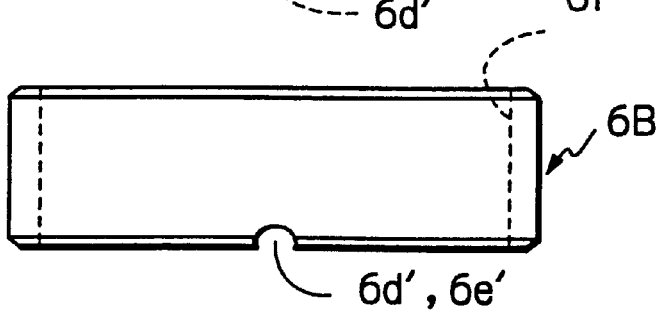
Figure 5A:
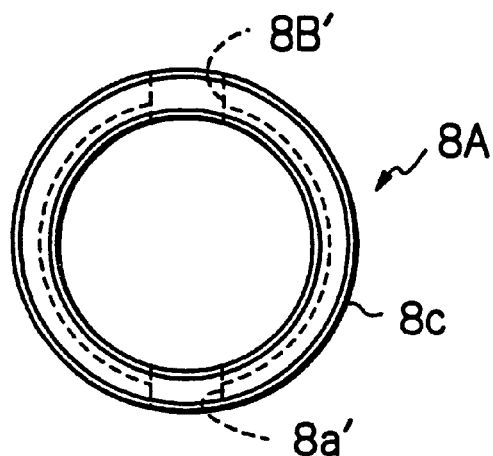
Figure 5B:
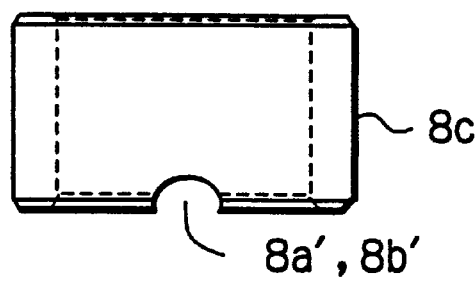
Figure 5C:
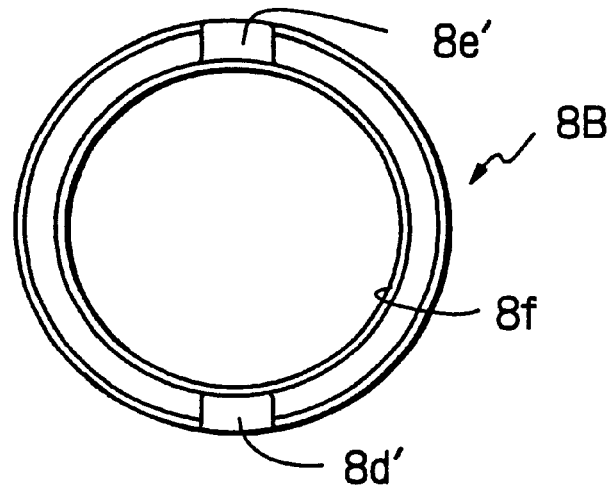
Figure 5D:
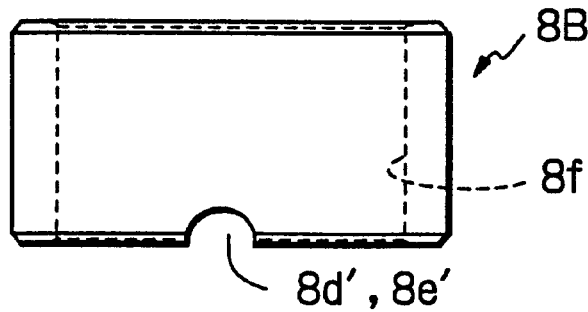
Figure 6A:
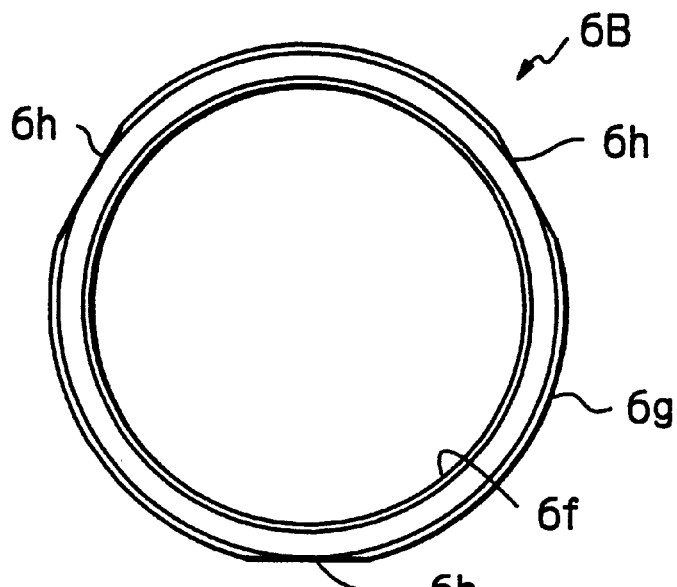
Figure 6B:
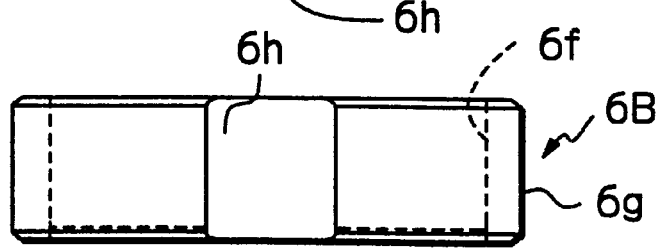
Figure 6C:
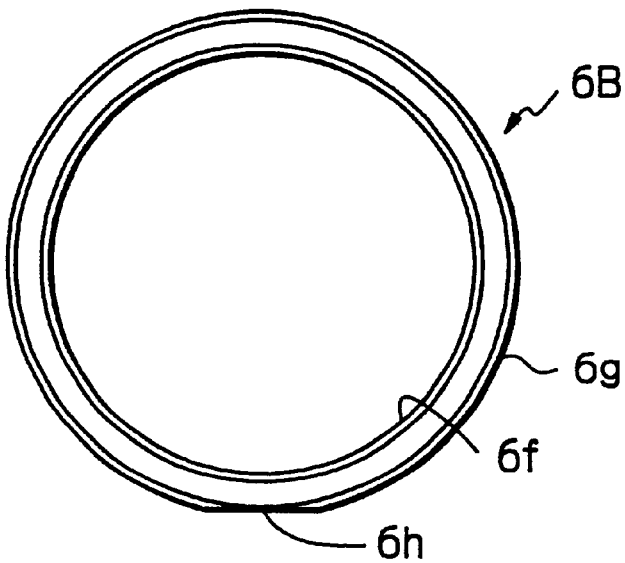
Figure 6D:
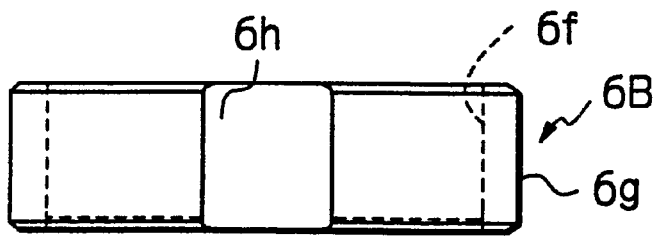
Figure 8A:
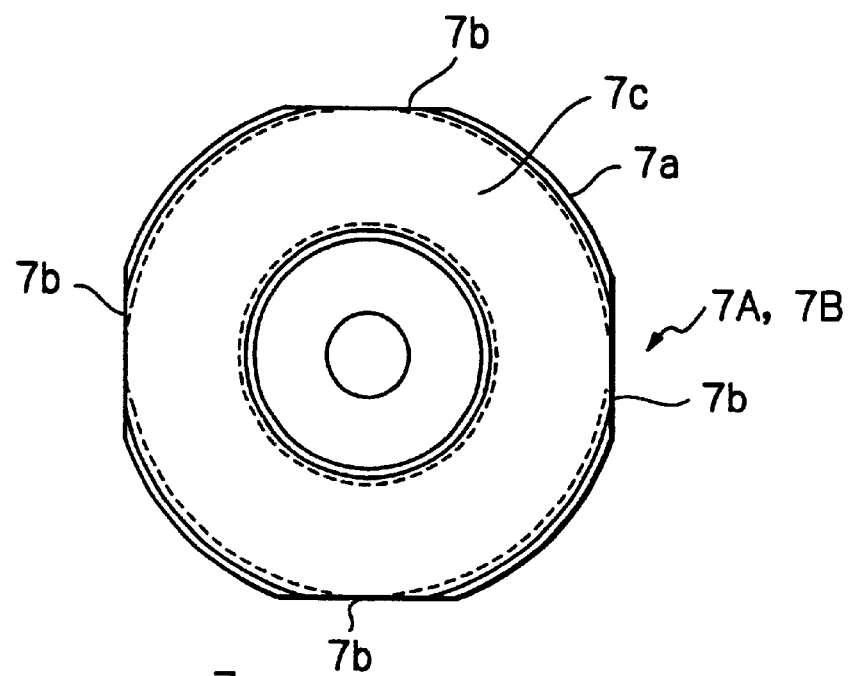
Figure 8B:
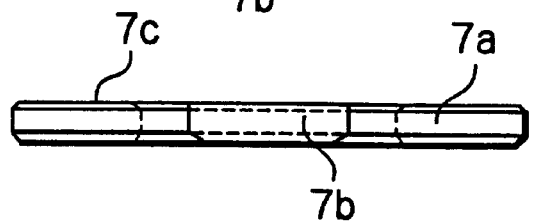
Figure 8C:
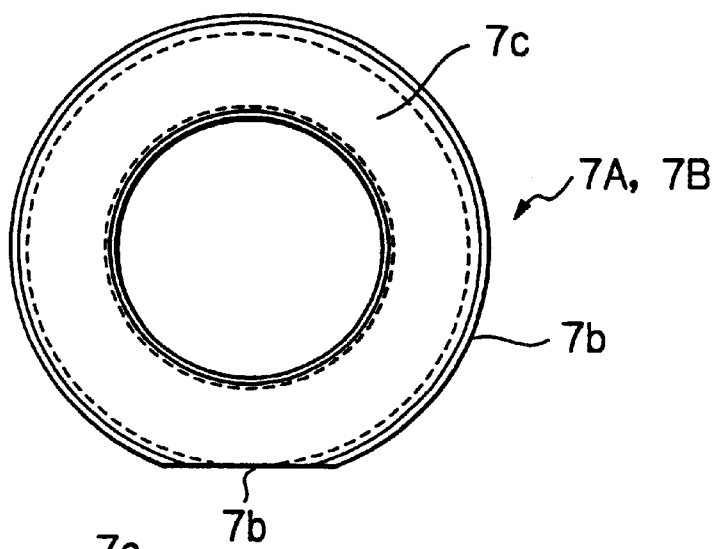
Figure 8D:
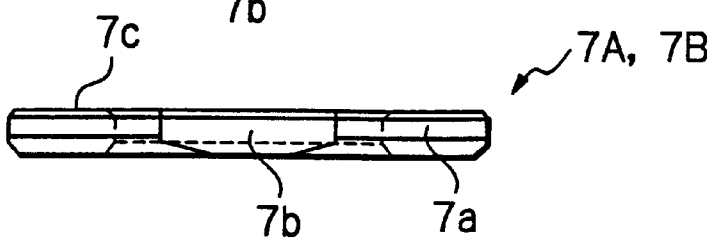
Figure 9A:
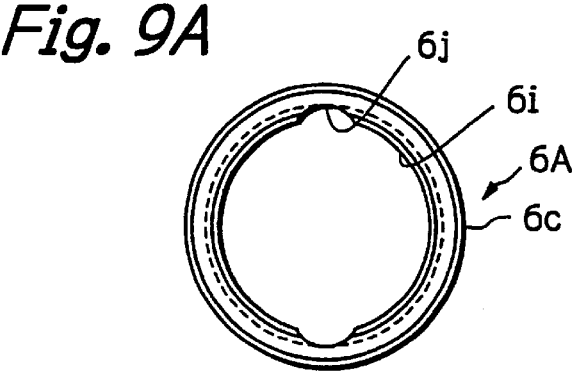
Figure 9E:
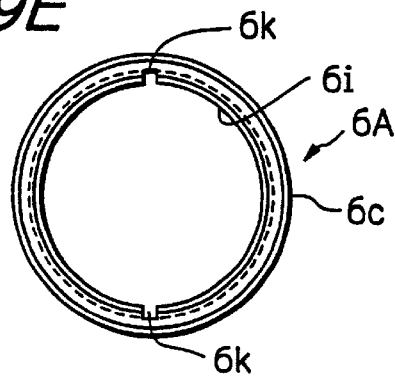
Figure 9B:
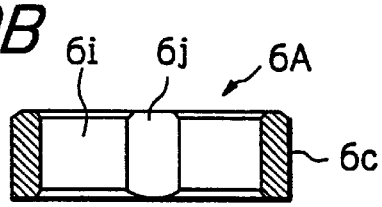
Figure 9F:
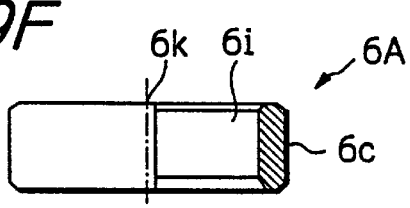
Figure 9C:
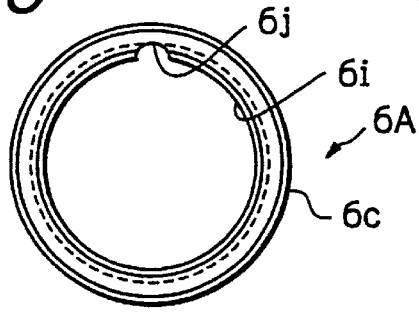
Figure 9G:
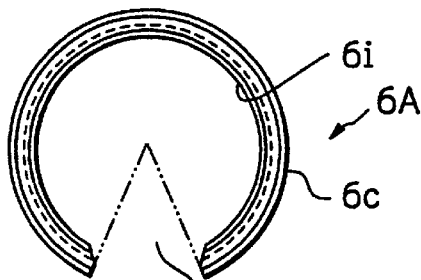
Figure 9D:
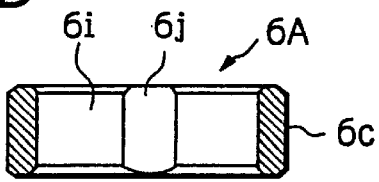
Figure 9H:
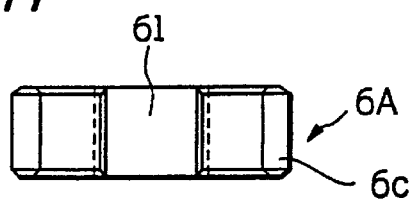
Figure 10A:
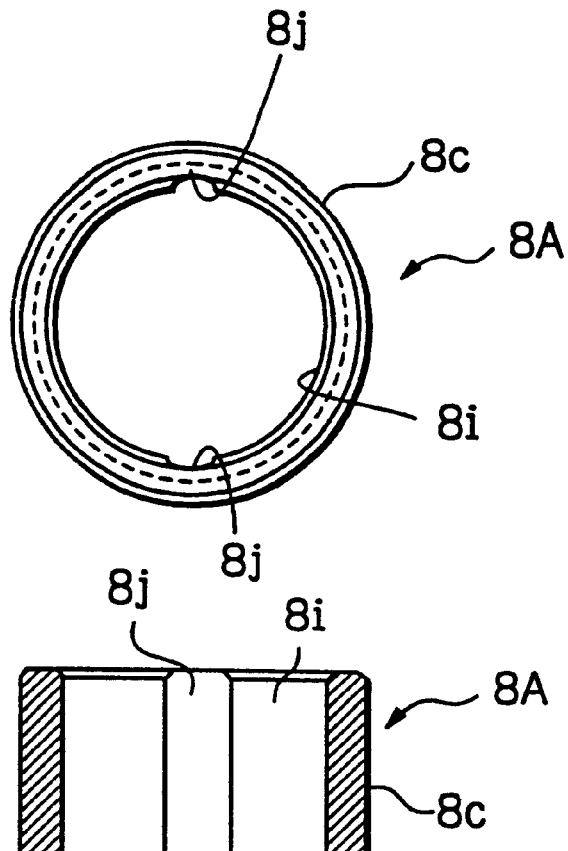
Figure 10B:
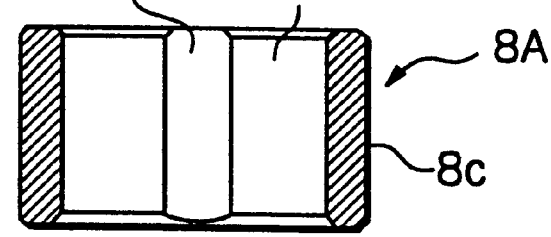
Figure 10C:
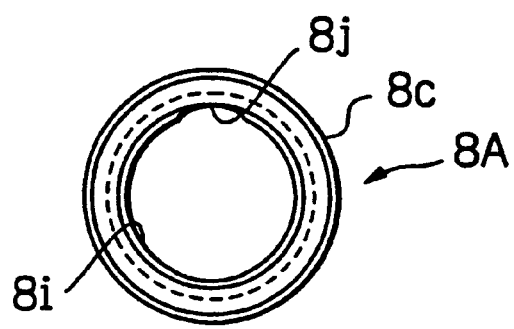
Figure 10D:
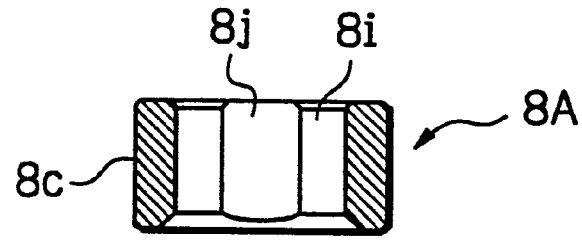
Figure 11A:
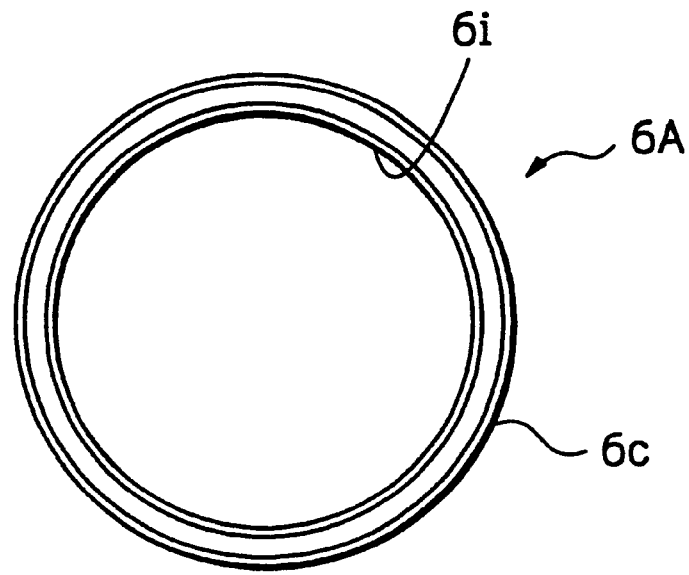
Figure 11B:
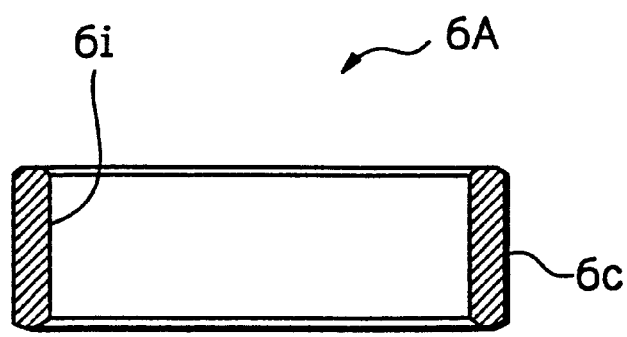
Figure 12A:
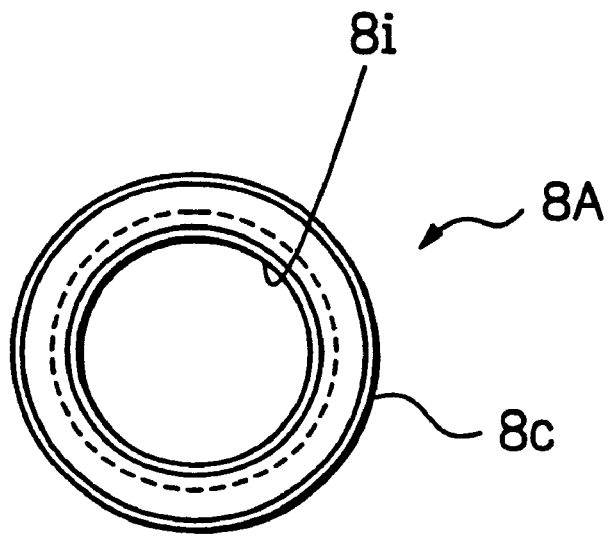
Figure 12B:
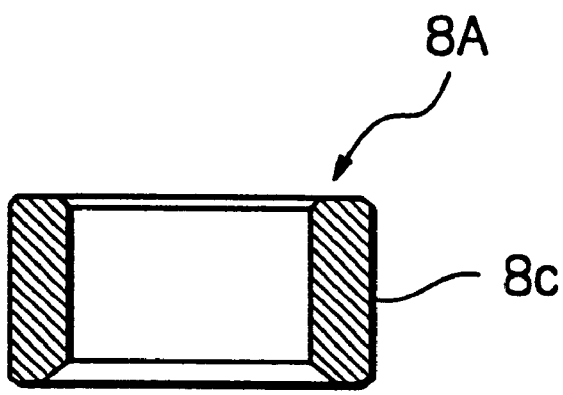
Figure 13A:
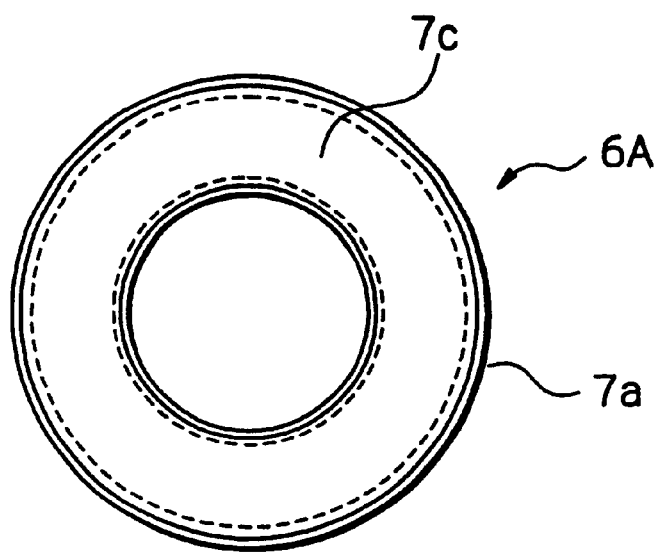
Figure 13B:
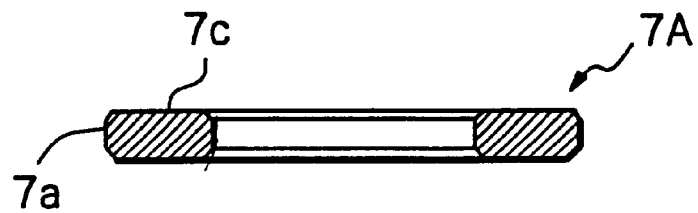
Figure 14:
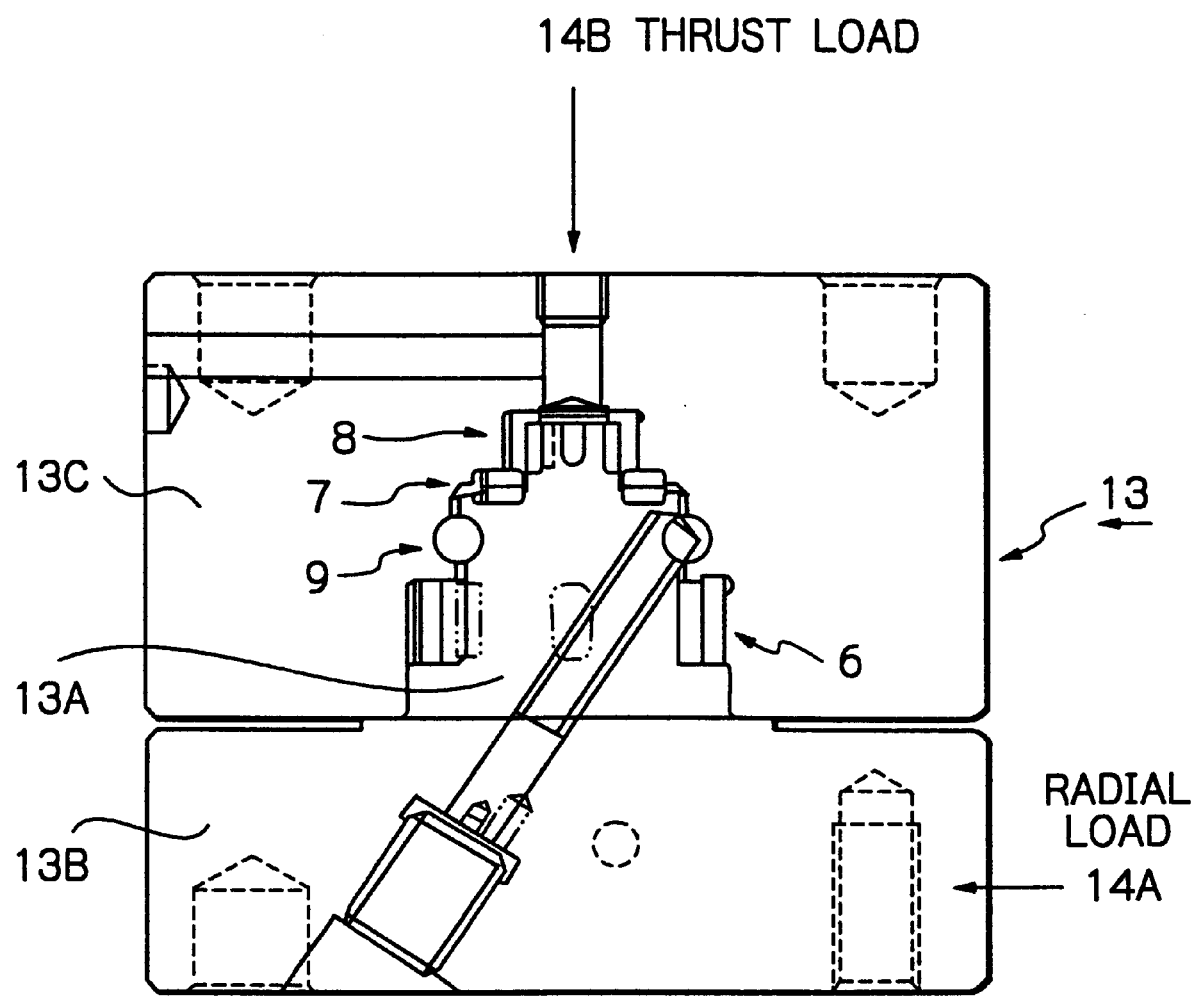

4B a side view showing the shaft-side split bearing member illustrated in FIG. 4A, FIG. 4C a plan view showing the cutter-side split bearing member of the radial bearing, and FIG. 4D a side view of the cutter-side split bearing member illustrated in FIG. 4C;

FIGS. 5A to 5D are diagrams useful in describing a modification of the radial bearing (nose pin bushing) shown in FIG. 1, in which FIG. 5A is a plan view illustrating the shaft-side split bearing member of the radial bearing, FIG. 5B a side view showing the shaft-side split bearing member illustrated in FIG. 5A, FIG. 5C a plan view showing the cutter-side split bearing member of the radial bearing, and FIG. 5D a side view of the cutter-side split bearing member illustrated in FIG. 5C;

FIGS. 6A to 6D are diagrams useful in describing modifications of the cutter-side split bearing member of the radial bearing (radial bushing) shown in FIG. 1, in which FIG. 6A illustrates a case where the outer circumferential surface of the cutter-side split bearing member is formed to have three engaged portions spaced equidistantly in the circumferential direction, FIG. 6C illustrates a case where the outer circumferential surface of the cutter-side split bearing member is formed to have one engaged portion, FIG. 6B is a side view showing the cutter-side split bearing member illustrated in FIG. 6A and FIG. 6D a side view showing the cutter-side split bearing member illustrated in FIG. 6C;

FIGS. 7A to 7D are diagrams useful in describing modifications of the cutter-side split bearing member of the radial bearing (nose pin bushing) shown in FIG. 1, in which FIG. 7A illustrates a case where the outer circumferential surface of the cutter-side split bearing member is formed to have three engaged portions spaced equidistantly in the circumferential direction, FIG. 7C illustrates a case where the outer circumferential surface of the cutter-side split bearing member is formed to have one engaged portion, FIG. 7B is a side view showing the cutter-side split bearing member illustrated in FIG. 7A and FIG. 7D a side view showing the cutter-side split bearing member illustrated in FIG. 7C;

FIGS. 8A to 8D are diagrams useful in describing a thrust bearing shown in FIG. 1, in which FIG. 8A is a plan view illustrating a split bearing member the outer circumferential surface of which is formed to have four engaged portions spaced equidistantly in the circumferential direction, FIG. 8B a side view of the split bearing member shown in FIG. 8A, FIG. 8C a plan view of the split bearing member the outer circumferential surface of which is formed to have one engaged portion, and FIG. 8D a side view of the split bearing member shown in FIG. 8D;

FIGS. 9A to 9H are diagrams useful in describing modifications of the shaft-side split bearing member of the radial bearing (radial bushing) shown in FIG. 1, in which FIG. 9A is a plan view illustrating a shaft-side split bearing member the inner circumferential surface of which is formed to have a pair of engaged portions, FIG. 9B a longitudinal sectional view of the shaft-side split bearing member shown in FIG. 9A, FIG. 9C a plan view of the shaft-side split bearing member the inner circumferential surface of which is formed to have one engaged portion, FIG. 9D a longitudinal sectional view of the shaft-side split bearing member shown in FIG. 9C, FIG. 9E a plan view illustrating a modification of the shaft-side split bearing member shown in FIG. 9A, FIG. 9F a half-sectional view of the shaft-side split bearing member shown in FIG. 9E, FIG. 9G a plan view illustrating another modification of the shaft-side split bearing member shown in FIG. 9A, and FIG. 9H a side view of the shaft-side split bearing member shown in FIG. 9G;

FIGS. 10A to 10D are diagrams useful in describing a modification of the shaft-side split bearing member in the radial bearing (radial bushing) shown in FIG. 1, in which FIG. 10A is a plan view illustrating the shaft-side split bearing member the inner circumferential surface of which is formed to have a pair of engaged portions, FIG. 10B a longitudinal sectional view of the shaft-side split bearing member shown in FIG. 10A, FIG. 10C a plan view of the shaft-side split bearing member the inner circumferential surface of which is formed to have one engaged portion, and FIG. 10D a longitudinal sectional view of the shaft-side split bearing member shown in FIG. 10C;

FIG. 11A is a plan view illustrating a shaft-side split bearing member, which is of a type devoid of an engaged portion, in the radial bearing (radial bushing) shown in FIG. 1, and FIG. 11B is a longitudinal sectional view of the shaft-side split bearing member shown in FIG. 11A;

FIG. 12A is a plan view illustrating a shaft-side split bearing member, which is of a type devoid of an engaged portion, in the radial bearing (radial pin bushing) shown in FIG. 1, and FIG. 12B is a longitudinal sectional view of the shaft-side split bearing member shown in FIG. 12A;

FIG. 13A is a plan view illustrating a split bearing member, which is of a type devoid of an engaged portion, in the thrust bearing shown in FIG. 1, and FIG. 13B is a longitudinal sectional view of the split bearing member shown in FIG. 13A; and FIG. 14 is a schematic view illustrating a laboratory apparatus for running an experiment on a bearing mechanism in accordance with the present invention.

DETAILED DESCRIPTION OF THE INVENTION

A preferred embodiment of a bit apparatus according to the present invention will now be described with reference to the accompanying drawings.

FIG. 1 is a partially enlarged view of a tri-con bit apparatus according to the present invention. As shown in FIG. 1, the apparatus includes a bit leg 1 the distal end of which is provided with a shaft 2 on which a cutter member 3 is supported in a rotatable manner. The cutter member 3 is provided with a cutter blade (cutting tooth) 4 at appropriate locations.

A bearing mechanism 5 is provided between the shaft 2 and the cutter member 3. The bearing mechanism 5 comprises a radial bearing (radial bushing) 6 for receiving a load in the radial direction, a thrust bearing (thrust washer) 7 for receiving a load in the thrust direction, a radial bearing (nose pin bushing) 8 for receiving a load in the radial direction, and a ball bearing 9.

The bearing mechanism 5 is supplied with grease from a grease storage chamber (not shown) via grease supply passages 10, 11. The cutter member 3 is provided with a special oil-seal member 12 by which the grease is prevented from leaking to the outside.

The radial bearings 6, 8 comprise cylindrical shaft-side split bearing members 6A, 8A and cylindrical cutter-side split bearing member 6B, 8B, respectively. The thrust bearing 7 comprises a disk-shaped shaft-side split bearing member 7A and a disk-shaped cutter-side split bearing member 7B. The material used to manufacture the radial bearings 6, 8 and thurst bearing 7 is a hard alloy.

The hard alloy is a composite material in which the main ingredient is tungsten carbide serving as a hard component. The composite material is formed by sintering using a metal substance such as nickel, iron or cobalt as a binder. In view particularly of durability, it is preferred that a cobalt substance be used as the binder. The hard component may include a carbide of group 4a, 5a or 6a, such as titanium carbide or tantalum carbide, or a carbon nitride.

If the binder content is less than 5 mass percent, the hardness of the hard alloy will itself decline and the bearing will tend to be destroyed. Conversely, if there is too much binder content, the bearing will not slide smoothly and will tend to be corroded by acids and alkalies in muddy water, as a result of which bearing lifetime is shortened.

If the binder content is made more than 20 mass percent, service life will be longer than that of the conventional beryllium-copper alloy but the cost of the hard alloy will be too high. From the standpoint of cost, therefore, a binder content of more than 20 mass percent is undesirable. Accordingly, it is preferred that the binder content fall within the range of 5 to 20 mass percent.

Figure 2A:
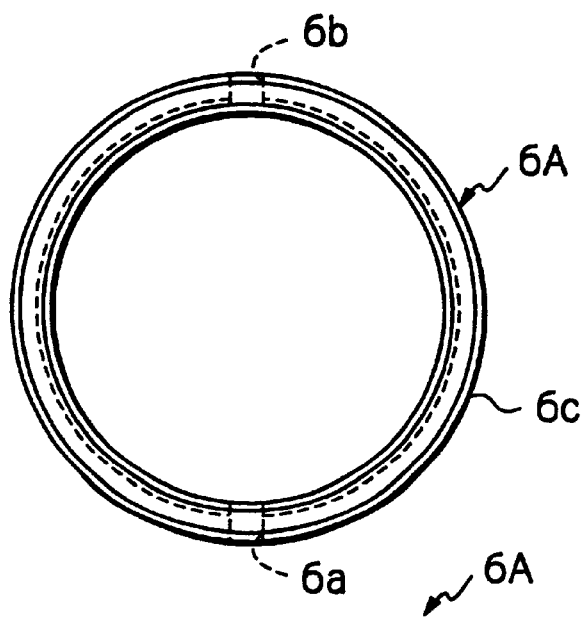
Figure 2B:
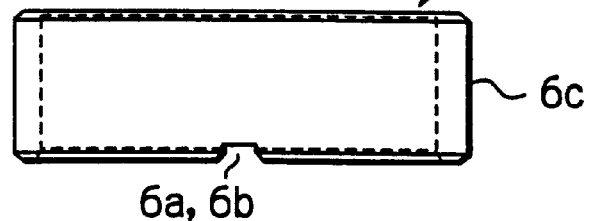

The shaft-side split bearing member 6A is formed to have a pair of radially extending, U-shaped grooves 6a, 6b in the lower portion thereof, as shown in FIGS. 2A and 2B. The shaft-side split bearing member 6A is fitted onto the shaft 2 and the U-shaped grooves 6a, 6b thereof function as engaged portions for mating with engaging portions (not shown) formed on the shaft 2. The shaft-side split bearing member 6A has an outer circumferential surface 6c furnished with a diamond coating.

Figure 2C:
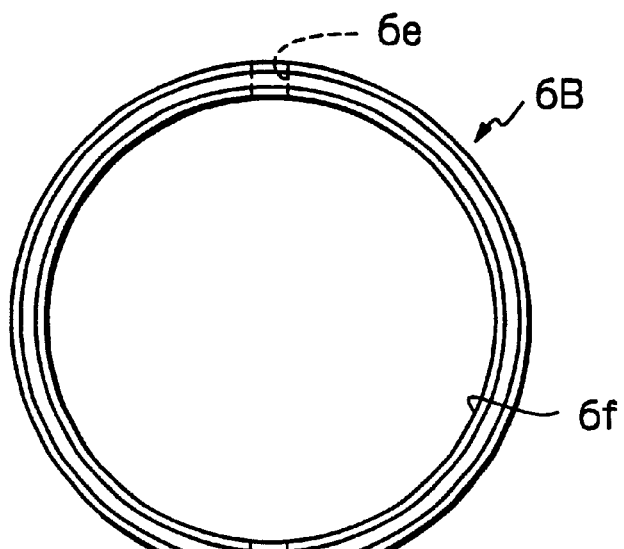
Figure 2D:
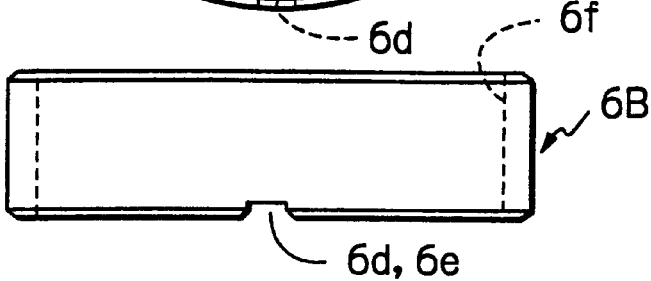

The cutter-side split bearing member 6B is formed to have a pair of radially extending, U-shaped grooves 6d, 6e in the lower portion thereof, as shown in FIGS. 2C and 2D. The cutter-side split bearing member 6B is received within a recess of the cutter member 3 and the pair of U-shaped grooves 6d, 6e thereof function as engaged portions for mating with engaging portions (not shown) formed in the recess. The cutter-side split bearing member 6B has an inner circumferential surface 6f that is also furnished with a diamond coating.

The shaft-side split bearing member 6A and cutter-side split bearing member 6B are fitted onto the shaft 2 so as to oppose each other and so as to be capable of rotating relative to each other. The diamond coating formed on the inner circumferential surface 6f and the diamond coating formed on the outer circumferential surface 6c are in frictional sliding contact with each other.

Figure 3A:
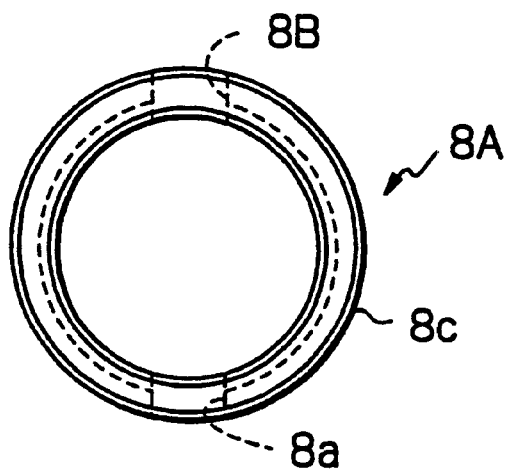
Figure 3B:
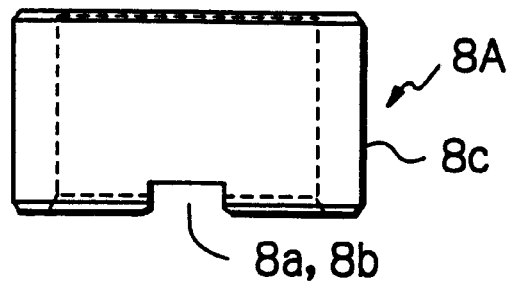

The shaft-side split bearing member 8A also is formed to have a pair of radially extending, U-shaped grooves 8a, 8b in the lower portion thereof, as shown in FIGS. 3A and 3B. The shaft-side split bearing member 8A is fitted onto the shaft 2 and the U-shaped grooves 8a, 8b thereof function as engaged portions for mating with engaging portions (not shown) formed on the shaft 2. The shaft-side split bearing member 8A has an outer circumferential surface 8c furnished with a diamond coating.

Figure 3C:
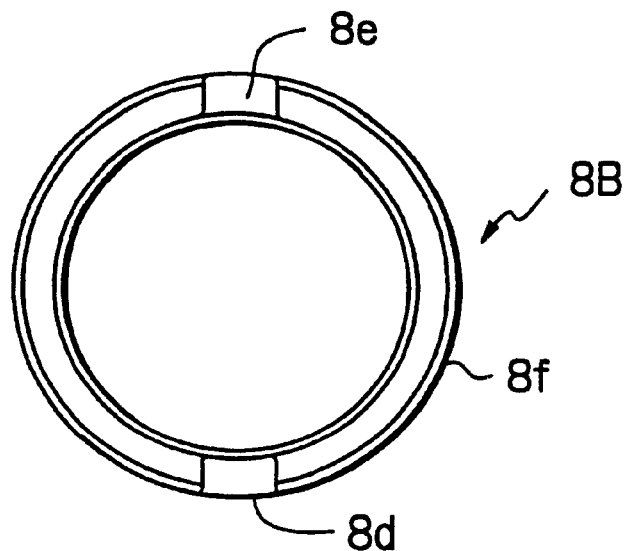
Figure 3D:
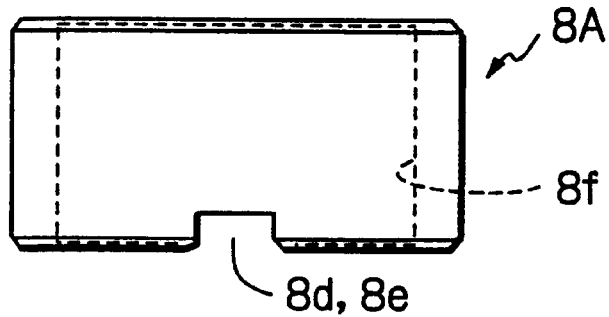

The cutter-side split bearing member 8B is formed to have a pair of radially extending, U-shaped grooves 8d, 8e in the lower portion thereof, as shown in FIGS. 3C and 3D. The cutter-side split bearing member 8B is received within a recess of the cutter member 3 and the pair of U-shaped grooves 8d, 8e thereof function as engaged portions for mating with engaging portions (not shown) formed in the recess. The cutter-side split bearing member 8B has an inner circumferential surface 8f that is also furnished with a diamond coating.

The shaft-side split bearing member 8A and cutter-side split bearing member 8B are fitted onto the shaft so as to be capable of rotating relative to each other. The diamond coating formed on the inner circumferential surface 8f and the diamond coating formed on the outer circumferential surface 8c are in frictional sliding contact with each other.

It is preferred that the diamond coatings be formed by vapor phase epitaxy (the CVD method) and that the film thickness thereof be 1 $\mu$m or more but no greater than 50 $\mu$m. If the film thickness is less than 1 $\mu$m, the film will be worn away, resulting in a decline in the sliding characteristic (the ability to slide smoothly). If the film thickness is greater than 50 $\mu$m, the film will tend to peel off. This will result in a shorter, rather than a longer, service life for the bearing. The sliding characteristic can be improved greatly if the outer circumferential surfaces 6c, 8c and inner circumferential surfaces 6f, 8f are polished to mirror surfaces before the diamond coating is applied, or if the diamond coatings are applied first and then polished to mirror surfaces.

In FIGS. 2A, 2B and FIGS. 3A, 3B, the bottoms of the shaft-side split bearing members 6A, 8A are formed to have the pairs of U-shaped grooves 6a, 6b, 8a, 8b, respectively, as the engaged portions. However, as shown in FIGS. 4A, 4B and FIGS. 5A, 5B, the bottoms of the shaft-side split bearing members 6A, 8A may be formed to have pairs of radially extending, arcuate grooves 6a', 6b', 8a', 8b, respectively, as the engaged portions. Further, in FIGS. 2C, 2D and FIGS. 3C, 3D, the bottoms of the cutter-side split bearing members 6B, 8B are formed to have the pairs of U-shaped grooves 6d, 6e, 8d, 8e, respectively, as the engaged portions. However, as shown in FIGS. 4C, 4D and FIGS. 5C, 5D, the bottoms of the cutter-side split bearing members 6B, 8B may be formed to have pairs of radially extending, arcuate grooves 6d', 6e', 8d', 8e', respectively, as the engaged portions.

Further, rather than providing the bottoms of the cutter-side split bearing members 6B, 8B with the U-shaped grooved 6d, 6e, 8d, 8e as the engaged portions, outer circumferential surfaces 6g, 8g of the cutter-side split bearing members 6B, 8B, respectively, may be formed to have notches 6h, 8h, respectively, as the engaged portions extending in a direction parallel to the direction in which the shaft 2 extends, and the recesses of the cutter member 3 may be formed to have engaging portions for mating with the notches 6h, 8h, as shown in FIGS. 6A to 6D and FIGS. 7A to 7D.

The shaft-side split bearing member 7A and the cutter-side split bearing member 7B each have an outer circumferential surface 7a formed to include notches 7b and a surface 7c furnished with a diamond coating, as shown in FIGS. 8A to 8D. The shaft-side split bearing member 7A is fitted into a recess of the shaft 2, and the cutter-side split bearing member 7B is fitted into a recess of the cutter member 3. The surface 7c of the shaft-side split bearing member 7A and the surface 7c of the cutter-side split bearing member 7B oppose each other and constitute surfaces of sliding contact that slide against each other. The shaft-side split bearing member 7A and cutter-side split bearing member 7B are capable of rotating relative to each other.

Further, rather than providing the bottoms of the shaft-side split bearing members 6A, 8A with the U-shaped grooved 6a, 6b, 8a, 8b as the engaged portions, inner circumferential surfaces 6i, 8i of the shaft-side split bearing members 6A, 8A, respectively, may be formed to have arcuate groove 6j, 8j, respectively, as engaged portions extending in a direction parallel to the direction in which the shaft 2 extends, as shown in FIGS. 9A to 9D and FIGS. 10A to 10D. Further, rather than forming the arcuate grooves 6j in the inner circumferential surface 6i of the shaft-side split bearing member 6A, U-shaped grooves 6k may be formed, as shown in FIGS. 9E and 9F, or the circumferential wall of the shaft-side split bearing member 6A may be formed to have a V-shaped notch 61, as shown in FIGS. 9G and 9F.

Preferably, a clearance between the opposing shaft-side split bearing members 6A, 6B, a clearance between the opposing cutter-side split bearing members 8A, 8B and a clearance between the sliding surfaces of the shaft-side split bearing member 7A and cutter-side split bearing member 7B fall within a range of 30 to 300 µm.

In general, the clearance between opposing members and the clearance between sliding surfaces of a bearing mechanism should be less than 10 µm in order to assure smooth rotation. In a tri-con bit apparatus, however, the cutting teeth 4 are dispersed over the cutter member 3 non-uniformly and they are acted upon by a variety of forces (torques) in radial and thrust directions. It has been clarified by experimentation that if the clearance between the split bearing members were less than 30 µm, there would be insufficient freedom for rotation and rotation would stop or an excessively large torque would act upon the cutter member 3 and cause destruction of the bearing mechanism 5 comprising the hard alloy.

Further, it has been clarified by experimentation that if the clearance between the split bearing members were made greater than 300 µm in order to provide the cutter member 3 with greater freedom for rotation, the area of contact between the bearing members would diminish, resulting in increased contact-surface pressure and destruction of the bearing mechanism 5.

In accordance with the present invention, the shaft-side split bearing members 6A to 8A co-rotate with the shaft 2, the cutter-side split bearing members 6B to 8B co-rotate with the cutter member 3, and the portions of high wear resistances between the shaft-side split bearing members 6A to 8A and cutter-side split bearing members 6B to 8B rotate while in contact. As a result, even if the oil seal fails and muddy water penetrates the bearing mechanism 5 during drilling by the bit apparatus, the relative rotation between the shaft-side split bearing members 6A to 8A and shaft 2 and the relative rotation between the cutter-side split bearing members 6B to 8B and cutter member 3 is impeded, as a result of which wear at these portions is suppressed.

In this embodiment of the present invention, both the shaft-side split bearing members 6A to 8A and the cutter-side split bearing members 6B to 8B are provided with the engaged portions. However, the engaged portions may be provided only in the shaft-side split bearing members 6A to 8A or only in the cutter-side split bearing members 6B to 8B. For example, an arrangement can be adopted in which the engaged portions are not provided in the shaft-side split bearing members 6A, 8A, as shown in FIGS. 11A, 11B, 12A and 12B, and an arrangement can be adopted in which the engaged portions are not provided in the shaft-side split bearing member 7A and cutter-side split bearing member 7B, as shown in FIGS. 13A, 13B.

Furthermore, the diamond coating is provided on the opposing surfaces and on the sliding surfaces in this embodiment of the invention. However, the opposing surfaces and sliding surfaces need not necessarily be provided with the diamond coating.

The results of experiments for comparing the bearing mechanism of the present invention with a conventional bearing mechanism will now be set forth.

FIG. 14 illustrates a laboratory apparatus 13 used in the comparison experiment. The laboratory apparatus 13 comprises a stationary portion 13B having a rotary shaft 13A that corresponds to the shaft 2, and a rotating portion 13C that corresponds to the cutter member 3. A bearing portion is formed between the stationary portion 13B and rotating portion 13C, the radial bearings 6, 8, the thrust bearing 7 and the ball bearing 9 are set in the bearing portion, a radial load 14A is applied to the stationary portion 13B and a thrust load 14B is applied to the rotating portion 13C.

A bearing comprising a beryllium-copper alloy was used as the conventional bearing. A bearing comprising a hard alloy was subjected to experimentation while setting the cobalt (Co) content to 6, 12, 4 and 30 mass percent. Bearing clearance was made 50, 150, 250, 10 and 300 µm. The cobalt contents of 4 and 30 mass percent where selected in order to provide a comparison with the present invention. Similarly, the clearances of 10 and 300 µm were selected to provide a comparison with the present invention.

As for the drilling conditions, the rotating portion 13C was rotated at a speed of 70 rpm and carbon steel was used as the drilled material. It was so arranged that muddy water (a KCl lignate standard solution) would penetrate the bearing portion, and the values of thrust load 14B and radial load 14A were each set to 10 tons.

Bearing wobble was used to evaluate service life. Service life was measured when the amount of wobble reached 0.2 mm.

The results of experimentation are illustrated below in Table 1.

In this experiment, the split bearing members according to the prior art and the split bearing members for comparison were of two types, namely a type having and a type not having an engaged portion for matching with an engaging portion on the stationary portion 13B and on the rotating portion 13C. Each type of split bearing member was subjected to experimentation by rotating it and not rotating it relative to the stationary portion 13B and rotating portion 13C. In addition, the diamond coating was not formed on the fitting surfaces and sliding-contact surfaces of the split bearing members.

TABLE 1

BEARING LIFETIME TEST RESULTS (1)

| | BEARING MATERIAL | ENGAGING PORTION | CLEARANCE | SERVICE LIFE |
|---|---|---|---|---|
| PRIOR-ART PRODUCT | Be-Cu | — | — | 4 hrs |
| INVENTIVE PRODUCT 1 | HARD 6% Co | 2 U-SHAPED GROOVES | 250 µm | 62 hrs |
| INVENTIVE PRODUCT 2 | HARD 6% Co | 3 ARCUATE GROOVES | 150 µm | 71 hrs |
| INVENTIVE PRODUCT 3 | HARD 6% Co | 3 NOTCHES | 50 µm | 95 hrs |
| INVENTIVE PRODUCT 4 | HARD 6% Co | 3 NOTCHES | 150 µm | 142 hrs |
| INVENTIVE PRODUCT 5 | HARD 6% Co | 3 NOTCHES | 250 µm | 88 hrs |
| INVENTIVE PRODUCT 6 | HARD 12% Co | 2 U-SHAPED LONGITUDINAL GROOVES | 250 µm | 62 hrs |
| INVENTIVE PRODUCT 7 | HARD 12% Co | 3 NOTCHES | 150 µm | 105 hrs |
| INVENTIVE PRODUCT 8 | HARD 12% Co | 1 U-SHAPED LONGITUDINAL GROOVE | 250 µm | 61 hrs |
| INVENTIVE PRODUCT 9 | HARD 12% Co | 2 U-SHAPED GROOVES | 250 µm | 84 hrs |

TABLE 1-continued

BEARING LIFETIME TEST RESULTS (1)

| | BEARING MATERIAL | ENGAGING PORTION | CLEARANCE | SERVICE LIFE |
|---|---|---|---|---|
| COMPARISON PRODUCT 1 | HARD 4% Co | 2 U-SHAPED GROOVES | 250 μm | CHIPPED AFTER 3 hrs |
| COMPARISON PRODUCT 2 | HARD 30% Co | 2 U-SHAPED GROOVES | 250 μm | 22 hrs |
| COMPARISON PRODUCT 3 | HARD 6% Co | NONE | — | 8 hrs |
| COMPARISON PRODUCT 4 | HARD 6% Co | 2 U-SHAPED GROOVES | 10 μm | CHIPPED AFTER 1 hr |
| COMPARISON PRODUCT 5 | HARD 6% Co | 2 U-SHAPED GROOVES | 300 μm | CHIPPED AFTER 11 hrs |

The experimental results show that whereas the prior-art product had a service life of 4 hrs, all of the products according to the present invention attained a service life of better than 60 hrs. Though the comparison products had longer lifetimes than that of the prior-art product, they were all shorter than those of the inventive products and were undesirable from the viewpoint of manufacturing cost and reliability.

Next, the products of the present invention shown in Table 1 were subjected to experimentation upon furnishing the fitting surfaces and sliding-contact surfaces thereof with a diamond coating. Inventive products 4, 6 and 7 were selected as the inventive products in Table 1. Inventive products 6 and 7 where used for comparison purposes and the film thicknesses of the diamond coatings thereof were made 0.5 and 80 μm, respectively. The inventive product 4 was tested with diamond-coating film thicknesses of 5, 20 and 50 μm. Further, a product provided to a thickness of 2 μm with a carbonaceous film (DLC: diamond-like coating) containing a diamond binder similar to a diamond coating was tested as an inventive product. The results of experimentation are shown in Table 2 below.

TABLE 2

BEARING LIFETIME TEST RESULTS (2)

| | BEARING MATERIAL | COATING | CLEARANCE | SERVICE LIFE |
|---|---|---|---|---|
| INVENTIVE PRODUCT 41 | HARD 6% Co | DIAMOND; 5 μm | 150 μm | 153 hrs |
| INVENTIVE PRODUCT 42 | HARD 6% Co | DIAMOND; 20 μm | 150 μm | 173 hrs |
| INVENTIVE PRODUCT 43 | HARD 6% Co | DIAMOND; 50 μm | 150 μm | 140 hrs |
| INVENTIVE PRODUCT 44 | HARD 6% Co | DLC; 2 μm | 150 μm | 150 hrs |
| COMPARISON PRODUCT 6 | HARD 6% Co | DIAMOND; 0.5 μm | 150 μm | 36 hrs |
| COMPARISON PRODUCT 7 | HARD 6% Co | DIAMOND; 80 μm | 150 μm | CHIPPED AFTER 14 hrs |

The experimental results show that although the comparison products had lifetimes longer than that of the prior-art product, these lifetimes clearly were shorter than those of the inventive products.

Thus, in accordance with the present invention, a radial bearing and a thrust bearing comprise a shaft-side split bearing member and a cutter-side split bearing member, and it is so arranged that the shaft-side split bearing member and cutter-side split bearing member are capable of being rotated relative to each other. As a result, even if muddy water penetrates the interior of the bit apparatus, it will not readily reach the fitting surfaces of the radial bearing and the sliding-contact surfaces of the thrust bearing. This makes it possible to minimize wear of the bearing mechanism and to prolong the life of the bit apparatus correspondingly.

As many apparently widely different embodiments of the present invention can be made without departing from the spirit and scope thereof, it is to be understood that the invention is not limited to the specific embodiments thereof except as defined in the appended claims.

What is claimed is:

1. A bit apparatus including:
   a) a shaft having an engaging portion;
   b) a cutter member having cutting teeth axially supported on said shaft for rotation about said shaft; and
   c) a bearing mechanism interposed between said cutter member and said shaft;
   wherein:
      said bearing member comprises at least a radial bearing for bearing a radially directed load and a thrust bearing for bearing an axially directed load;
      said radial bearing includes a shaft-side split bearing member and a cutter-side split bearing member;
      said shaft-side split bearing member has an engaged portion for engaging said engaging portion in such a manner that said shaft-side split bearing member co-rotates with said shaft;
      said shaft-side split bearing member and said cutter-side split bearing member are rotatable relative to each other; and
      a diamond film on at least one of said shaft-side split bearing member and cutter-side split bearing member and on mutually opposing surfaces of both said shaft-side split bearing member and said cutter-side split bearing member.

2. The bit apparatus according to claim 1, wherein a clearance on the order of 30 to 300 μm is provided between said shaft-side split bearing member and said cutter-side split bearing member.

3. The bit apparatus according to claim 1, wherein said radial bearing is a hard alloy in which a main ingredient is a tungsten carbide substance containing a cobalt substance of 5 to 20 mass percent.

4. A bit apparatus including:
   a) a shaft having an engaging portion;
   b) a cutter member having cutting teeth axially supported on said shaft for rotation about said shaft; and
   c) a bearing mechanism interposed between said cutter member and said shaft;
   wherein:
      said bearing mechanism comprises at least a radial bearing for bearing a radially directed load and a thrust bearing for bearing an axially directed load;
      said thrust bearing including a shaft-side split bearing member and a cutter-side split bearing member;
      said shaft-side split bearing member has an engaged portion for engaging said engaging portion in such a manner that said shaft-side split bearing member co-rotates with said shaft;
      said shaft-side split bearing member and said cutter-side split bearing member are in sliding contact and rotatable relative to each other; and
      a diamond film on at least one of said shaft-side split bearing member and cutter-side split bearing member and on sliding-contact surfaces thereof.

5. The bit apparatus according to claim 4, wherein a sliding-contact clearance on the order of 30 to 300 μm is provided between said shaft-side split bearing member and said cutter-side split bearing member.

6. The bit apparatus according to claim 4, wherein said radial bearing is a hard alloy in which a main ingredient is a tungsten carbide substance containing a cobalt substance of 5 to 20 mass percent.

7. The bit apparatus according to claim 1 or claim 4, wherein said engaged portion is a groove or a notch.

8. A bit apparatus including:
   a) a shaft;
   b) a cutter member having an engaging portion and cutting teeth axially supported on said shaft for rotation about said shaft; and
   c) a bearing mechanism interposed between said cutter member and said shaft;
   wherein:
      said bearing member comprises at least a radial bearing for bearing a radially directed load and a thrust bearing for bearing an axially directed load;
      said radial bearing includes a shaft-side split bearing member and a cutter-side split bearing member;
      said cutter-side split bearing member has an engaged portion for engaging said engaging portion in such a manner that said cutter-side split bearing member co-rotates with said cutter member;
      said shaft-side split bearing member and said cutter-side split bearing member are rotatable relative to each other; and
      a diamond film on at least one of said shaft-side split bearing member and cutter-side split bearing member and on mutually opposing surfaces of both said shaft-side split bearing member and said cutter-side split bearing member.

9. The bit apparatus according to claim 8, wherein a clearance on the order of 30 to 300 μm is provided between said shaft-side split member and said cutter-side split member.

10. The bit apparatus according to claim 8, wherein said radial bearing is a hard alloy in which a main ingredient is a tungsten carbide substance containing a cobalt substance of 5 to 20 mass percent.

11. A bit apparatus including:
    a) a shaft;
    b) a cutter member having an engaging portion and cutting teeth axially supported on said shaft for rotation about said shaft; and
    c) a bearing mechanism interposed between said cutter member and said shaft;
    wherein:
       said bearing mechanism comprises at least a radial bearing for bearing a radially directed load and a thrust bearing for bearing an axially directed load;
       said thrust bearing including a shaft-side split bearing member and a cutter-side split bearing member;
       said cutter-side split bearing member has an engaged portion for engaging said engaging portion in such a manner that said cutter-side split bearing member co-rotates with said cutter member;
       said shaft-side split bearing member and said cutter-side split bearing member are in sliding contact and rotatable relative to each other; and
       a diamond film on at least one of said shaft-side split bearing member and cutter-side split bearing member and on sliding-contact surfaces thereof.

12. The bit apparatus according to claim 11, wherein a clearance on the order of 30 to 300 μm is provided between said shaft-side split member and said cutter-side split member.

13. The bit apparatus according to claim 11, wherein said radial bearing is a hard alloy in which a main ingredient is a tungsten carbide substance containing a cobalt substance of 5 to 20 mass percent.

14. The bit apparatus according to claim 8 or claim 11, wherein said engaged portion is a groove or a notch.

* * * * *